United States Patent [19]

Curl

[11] Patent Number: 4,490,970
[45] Date of Patent: Jan. 1, 1985

[54] CONVEYOR LINK

[75] Inventor: Robert B. Curl, Twin Falls, Id.

[73] Assignee: Superior Chain, Inc., Twin Falls, Id.

[21] Appl. No.: 286,657

[22] Filed: Jul. 24, 1981

[51] Int. Cl.³ .............................................. F16G 13/24
[52] U.S. Cl. ........................................ 59/79.1; 59/84; 198/851; 198/853
[58] Field of Search .................. 59/79.1, 80, 78, 901, 59/90, 84, 82; 474/207; 198/850, 851, 853, 688, 640

[56] References Cited

U.S. PATENT DOCUMENTS

| | | | |
|---|---|---|---|
| 1,693,431 | 11/1928 | Behning | 474/207 |
| 3,127,980 | 4/1964 | Lanham | 198/850 |
| 3,227,839 | 6/1967 | Sigety | 198/840 |
| 3,352,407 | 11/1967 | Wright | 198/851 |
| 3,512,356 | 5/1970 | Krekeler | 59/84 |
| 3,513,965 | 5/1970 | Miller | 198/850 |
| 3,646,752 | 3/1972 | Kampfer | 474/207 |
| 3,921,792 | 11/1975 | Anderson | 198/851 |
| 4,159,763 | 7/1979 | Kewley | 474/207 |
| 4,171,045 | 10/1979 | Lapeyre | 198/688 |
| 4,195,887 | 4/1980 | Ruddell | 474/207 |

Primary Examiner—Gene P. Crosby
Attorney, Agent, or Firm—Trask & Britt

[57] ABSTRACT

A removable, polymeric conveyor link and conveyor utilizing such a link are disclosed. The link is essentially an elongated body of tough, hard slightly flexible elastomer with at least a pair of spaced, parallel, cylindrical cavities in which are disposed rod locking devices. The conveyor is constructed of metal rods, generally round in cross-section, wherein at least a pair of spaced metal rods are held in position by flexible elastomer spacers (fixed links) near each end whereby the end rods protrude through such spacers and then are joined by the removable elastomer links having rod locking sleeves.

12 Claims, 16 Drawing Figures

CONVEYOR LINK

BACKGROUND OF THE INVENTION

1. Field: This invention relates to conveyors, and particularly to conveyors associated with various crop harvesting equipment and processing, such as those used for onions, sugar beets, potatoes and similar crops.

2. Prior Art: Typical conveyors utilized in crop harvesting have hooks on each end to join each rod with adjacent rods to form a conveyor. These conveyors are generally constructed so that the conveyor may be disassembled in the field.

OBJECTS OF THE INVENTION

It is an object of the instant invention to provide a link conveyor whereby straight, unbent rods may be utilized;

It is a further object of the instant invention to provide a link conveyor which can be readily disassembled in the field;

A further object of this invention is to provide a link conveyor having flexible link members.

SUMMARY OF THE INVENTION

A removable link which has an elongated body of a tough, hard, slightly flexible elastomer which includes rubbers, plastics and the like has been invented. The link joins metal rods to form a conveyor of spaced metal rods. The link has at least a pair of parallel, spaced, cylindrical cavities which are adapted in size to receive the ends of metal rods therein. In each cavity adhered to the link body there is a rod locking member, such as a split sleeve which has an inside diameter slightly smaller than the outside diameter of the rod it is intended to receive. The tubular cavities generally extend through the body of the link.

The link is placed on rod ends by hammering or driving the link onto the rod and, similarly, the link may be removed, for example, in the field, by driving or hammering the link off the rod ends. Thus, a link or conveyor sub-assembly may be replaced in the field without having to bring the harvester or other equipment utilizing such a conveyor into a shop.

The metal rod conveyor, which may be made in sub-assembly form, comprises at least a pair of spaced metal rods attached to spacing means, which may be fixed or removable spacers of substantially the same material that is used in the removable links. At least a pair of rod tips, generally the outer pair of rods, extend beyond the spacers (fixed link) at each end wherein a sufficient length of rod tips are available to receive the removable link members and thus join a pair of sub-assemblies together.

The removable link members and spacers (fixed links) may be of the same tough, slightly flexible material. The polymeric material is generally sufficiently flexible that a conveyor made of such links and spacers will flex sufficiently that the chain conveyor may move around a sprocket or cog wheel without the rods rotating or moving with respect to the links or spacing means, that is, the rods are held firmly by the links and spacers with the links and spacers flexing slightly to accommodate the curvature of the cog or sprocket.

Generally, conveyors constructed in this manner are relatively large size, that is, the metal rods are at least one foot in length and have a diameter of at least ¼ inch. The length of the rod is approximately the conveyor width. The spacing between rods is generally at least an inch, and preferably about two inches. The removable links and spacers should have sufficient thickness to be sufficiently rugged and durable to endure the rough use encountered on harvesting machines and other machines used during crop planting and harvesting. The flexibility of the links and spacers should be sufficient to permit the conveyor to conform to the radius of a sprocket as small as about four inches in diameter, although generally the sprockets will be at least six inches in diameter and greater. Further description of the invention may be facilitated by reference to the attached drawings.

Figure 1:
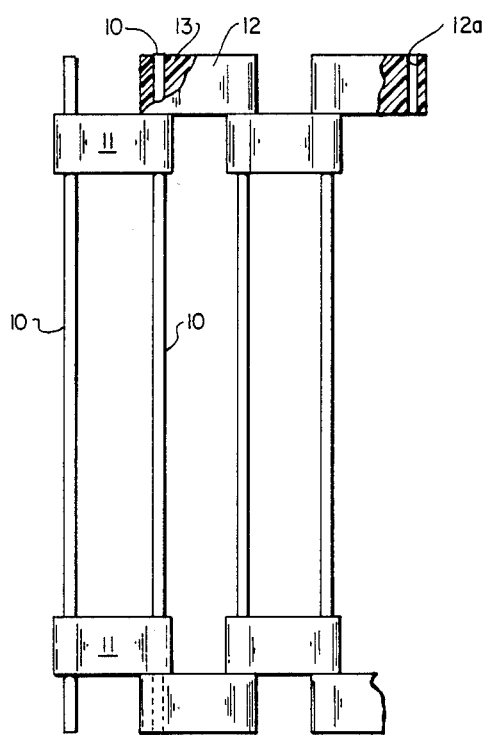
FIG. 1 is a plan view of a metal rod conveyor using removable, elastomeric links.

In FIG. 1 a conveyor of the instant invention is illustrated in plan view. Metal rods 10 are held in positions by fixed links or spacers 11. The fixed links 11 are of a hard, slightly flexible elastomer, which may be rubber or a plastic to which the rods are immobily fixed; as for example, by having the elastomer adhered to the rods. The end rods of a pair of rods are coupled together by a removable link 12. The removable link 12 is generally of about the same dimensions and constructed of the same material as the fixed links 11. The removable link has a pair of cylindrical cavities 12a near its ends which are adapted to receive rods 10. Disposed within the cavities 12a are rod retaining means such as sleeves 13 which are a split sleeve having a diameter slightly smaller than the diameter of the rods so that as the link is forced upon the rods it forms a wedged fit.

Figure 2:
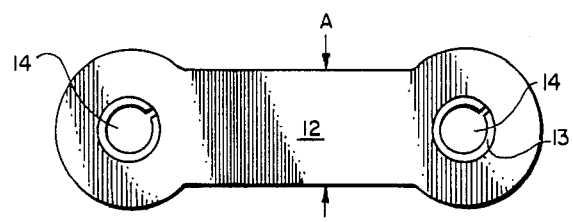
FIG. 2 is an elevational view of a removable elastomeric link.

FIG. 2 illustrates a novel link 12 in elevational display. The link 12 has a "bar-bell" shape since it is generally preferred to have sufficient material, that is, rubber or plastic, surrounding the sleeve 13 to provide adequate bearing strength so that the rod does not tear out of the link. The midsection A of the link may be slightly narrower than the ends of the link so as to provide enough flexibility that the conveyor may turn about a sprocket without any relative movement between the rods and the fixed links or removable links. Thus, a hard, very slightly flexible material may be used for the links necking-down the waist region between the cylindrical cavities 14 in each end of the link.

Fixed link 11 may have the same general shape and size as removable link 12. In fact, it may be desirable to have the same general shape, size, materials and construction for the low links so that the conveyor is substantially uniform in its strength and flexibility. It may be preferred, however, to use a fixed link of slightly greater strength than the removable link so that should a failure or break occur it would more likely occur in the more easily replaceable movable link.

The links of this invention may be reinforced with fiberglass, nylon, graphite fibers, steel fibers or the like. Each link will encounter a fair amount of flexing through the waist region "A" and it may be desirable to have long linear fibers running lengthwise of the link to provide strength and to resist fatigue.

Figure 3:
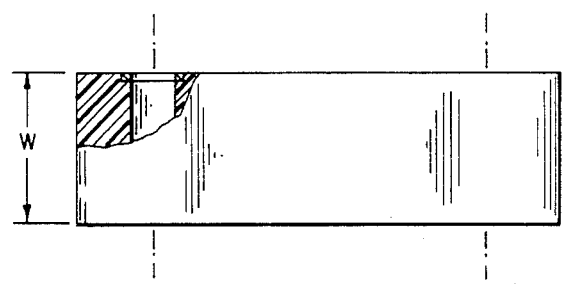
FIG. 3 is a plan view of the link of FIG. 2.

The link of FIG. 2 is illustrated in FIG. 3 in plan view. Generally, the width of the link "W" is about the same as the thickness "A" of the link at the waist region. It may be desirable on occasion to have the link width slightly wider to prevent any flexing about the width. Also, it is generally desired that the link resist torsional stresses.

The split-sleeve 13 is generally a metal sleeve which is adhered to the elastomer body. The sleeve has a diameter slightly smaller than the diameter of the tube that it is adapted to receive. A rod is forced into the sleeve to achieve a force-fit. The link may be removed from the rod by forcing it off the rod with the use of a hammer or other means. The link is reusable since the metal sleeve has a memory of its original diameter. Upon removal of a link from a rod, the split sleeve tends to assume its original diameter.

Figure 5:
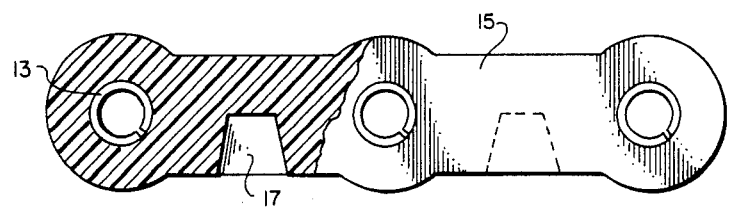
FIG. 5 is an elevational view of a removable, elastomeric link adapted to receive three metal rod members.
Figure 4:
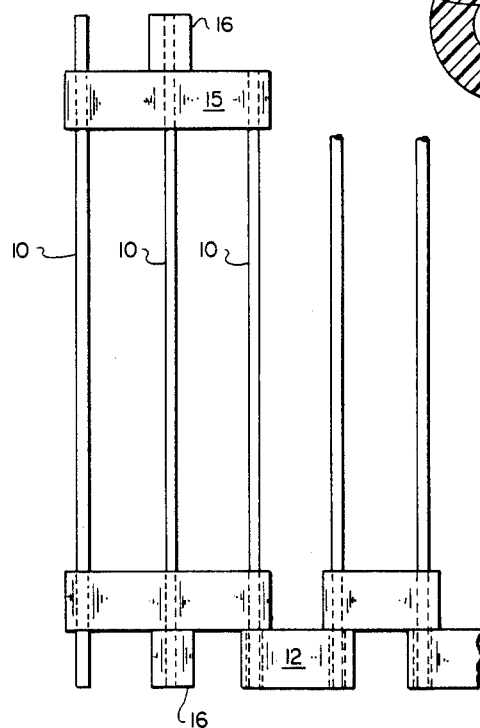
FIG. 4 is a plan view of a metal rod conveyor having conveyor sub-assemblies joined by removable, elastomeric links.

A slight variation in the conveyor is illustrated in FIG. 4 in a plan view. Three rods 10 are grouped together in a sub-assembly and held together by a common fixed link 15. All of the rods may be of the same length or the central rod of the three rods may be shorter. When all the rods are the same length, a cap member 16 is used to cover the center rod, although the rod may be left exposed if this does not present a safety hazard. The outermost rods of a sub-assembly are joined to another sub-assembly by a removable link member such as that illustrated in FIGS. 2 and 3. The fixed link may be one which has metal inserts 13, such as that illustrated in FIG. 5. Thus, the fixed link may be driven onto the rods and allowed to remain there as a fixed link even though it could be removed after the coupling or removable link 12 is removed to disjoin sub-assemblies.

If one of the three rods of the sub-assembly broke or became so worn it had to be replaced, the whole sub-assembly would be removed and replaced with another sub-assembly. This would be done by removing the coupling or removable links 12 which couple the worn sub-assembly to adjoining sub-assemblies on either side and by replacing the worn sub-assembly with a new sub-assembly. Also, a fixed link 15 which has a split-sleeve 13 encased therein permits an individual rod to be removed therefrom by removing the coupling link 12, driving the rod out of the fixed link 15 and replacing it with a new rod.

The conveyors of this invention are designed to be driven generally by sprockets or cog wheels having teeth radiating in uniform spacing therefrom. The sprockets generally contact the rods to drive the conveyor. This has been traditional practice with the various kinds of harvesting equipment for crops such as potatoes, onions, sugar beets, yams and the like. A variation available with the instant invention is to provide link members, either the removable link members or the fixed link members, with recesses such as recess 17 illustrated in FIG. 5 whereby the recess accommodates the tooth of a sprocket. Sprocket teeth engage recesses 17 in the outside or end portions of the fixed links to drive the conveyor. Conveyors constructed in this manner are considerably quieter in operation even though metal rods are used as the cross members of the conveyor. Generally, the waist region of a link would preferably be slightly greater in thickness whenever a tooth recess is provided therein. Also, any link containing a tooth recess would preferably have a reinforcement of fiberglass or other appropriate material.

Figure 6:
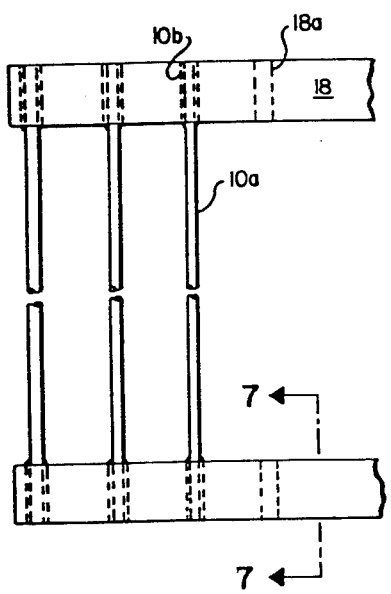
FIG. 6 is a plan view of a metal rod conveyor utilizing removable continuous belts.
Figure 7:
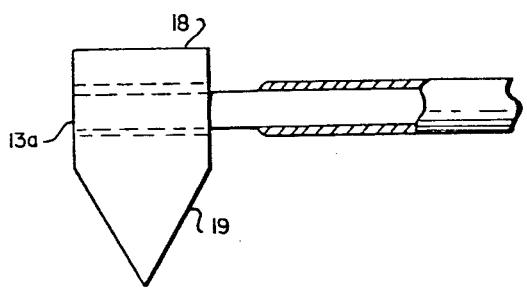
FIG. 7 is a cross-sectional view of the conveyor of FIG. 6 along section lines 7—7.

Another variation in the instant invention is illustrated in FIGS. 6 and 7. A continuous or semi-continuous belt can be provided with spaced openings containing sleeve inserts whereby rods can be forced therein to provide either a continuous or semi-continuous belt drive conveyor with rod members.

In the belt illustrated in FIG. 6, in plan view, a continuous or endless belt 18 with spaced oblong cavities 18a which provide an opening which is perpendicular to the longitudinal axis of the belt. The oblong opening is disposed so that its wider axis parallels the longitudinal axis of the belt. The rods 10a are round in their center section and flattened on each end. The flattened ends 10b of the rods 10a are locked in position by sleeves 13a which are oblong rather than round. The sleeves need not be split, i.e., a whole sleeve can be used, since the non-round shape assures that no rotation of the rod within the sleeve will occur. Split sleeves are generally preferred, however.

The use of oblong sleeves and rods with flattened ends provide several advantages, such as elimination of slippage or rotation of the rod within the sleeve and the sleeve within its cavity, assured alignment of flights, tabs or the like affixed to the rods, and a lower profile link or belt. An end elevational view is provided showing the lower portion of the belt 19 with a V-shape to fit within a drive pulley or shive.

As indicated, a continuous conveyor may be made in the manner just described to provide belts 18 which are continuous. Also, a conveyor belt can be made in semi-continuous form by making sub-assemblies of belts sections containing a few or many rods driven into the metal inserts. Such sub-assemblies can then be joined together by a link member such as coupling link 12 of FIG. 2.

Figure 8:
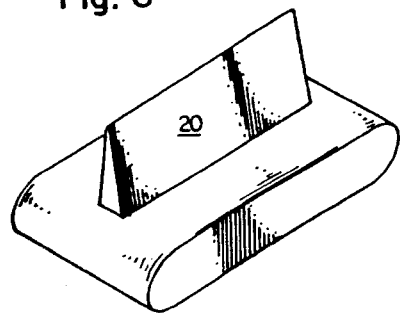
FIG. 8 is a perspective view of a removable, elastomeric link having a vertical, longitudinal fin therein.
Figure 9:
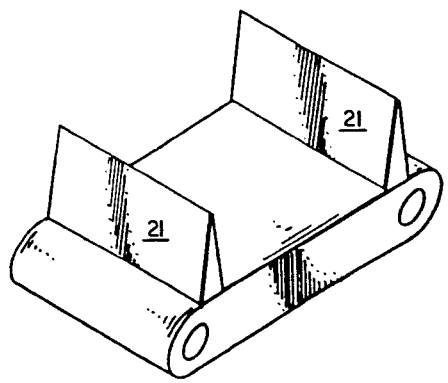
FIG. 9 is a perspective view of a removable, elastomeric link having a pair of flight extensions thereon.

The links of this invention, both the fixed links and the removable links, may be made to cooperate with the rod portions of the conveyor in various ways. In FIGS. 8 and 9, links are illustrated with a sidewall or fin 20 which is located approximately in the midsection of the link and runs lengthwise of the link. Also, as illustrated in FIG. 9, flight extensions 21 may be attached to the link whereby any flights which are attached to the rod members are extended.

Figure 10:
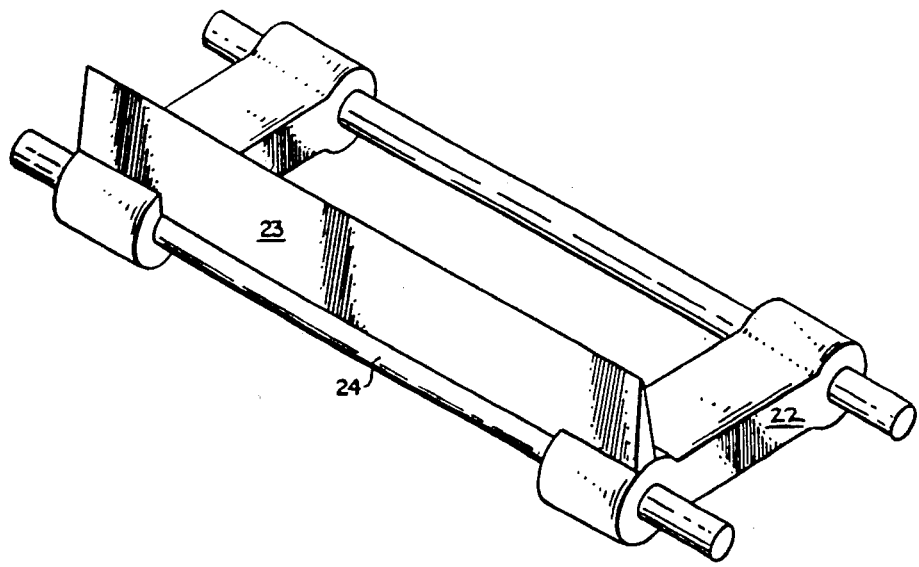
FIG. 10 is a perspective view of a conveyor subassembly illustrating an integral flight upon a rod and a link.

FIG. 10 shows a sub-assembly wherein the sub-assembly is substantially a cast or injected unit wherein a fixed link 22 is integral with a flight 23 and rubber covering 24. Rubber coverings on conveyor rods protect the crops from being bruised as they are dropped onto a conveyor or while being conveyed. The flight 23 prevents the crop from rolling along the conveyor whenever the conveyor is disposed along an incline. Generally, flight members would not be used on every rod, although they could be. Flight members typically would be used on every other rod or, for example, on every fourth rod wherein the sub-assembly illustrated in FIG. 10 would be placed adjacent a sub-assembly of two rods which had no flights thereon. Then following that would be another sub-assembly which contained a flight.

The conveyors of the instant invention have many advantages. Such conveyors should experience less wear in comparison with conveyors formed of metal links since the metal-to-metal wear between links rapidly renders links of such conveyors unusable, requiring frequent link replacement. In the instant invention, the only metal-to-metal contact is by the sprockets upon the rods. Further, to decrease the metal-to-metal wear, the links themselves may be provided with recesses whereby the sprockets engage the links to drive the conveyor. The sprocket recesses may be provided in the fixed links or in the removable links. It may generally be desirable whenever sprocket recesses are provided to provide same in the removable links since, as wear occurs, the removable links may be easily replaced. Also, the removable links are preferably slightly weaker than the fixed links so that in the event of any failure the failure will occur in the removable link which is easily replaced.

Link members of the type described herein are generally formed of a durable, flexible material such as a flexible, solid urathane or rubber material. The links may be reinforced with fiberglass, graphite, nylon or other fiber materials either in fiber or mat form. Generally, fibers and mats would be placed in planes which are substantially parallel to the direction of travel to the conveyor, that is, that the reinforcement would run lengthwise of the link and any transverse fibers would run substantially parallel to the cavities within said links. Link members, depending upon the strength of the flexible material used therein, may have a width of from one inch to four inches, a width of one-fourth inch to one inch or more, and a thickness of one-fourth inch to one inch or more.

The fixed links may have substantially greater lengths inasmuch as a fixed link may incorporate two, three or more rod members in a sub-assembly. Generally, coupling or removable links will join only two rods together and thus will have a length only sufficient to accommodate the spacing of two adjacent rods.

Generally, for purposes of this invention, the flexible material is a strong rubber or elastomer such as polyurethane, polybutadiene or the like which may be cast or injected to achieve a hard durable member. Generally, durometer readings of about 50 to about 80 are preferred while tensile strengths in the range of about 3500 to about 6000 psi are desired. The material should resist fatigue.

Figure 13:
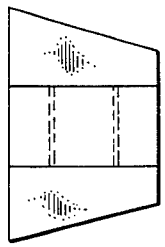
FIG. 13 is an end elevational view of a V-shaped link of FIG. 11.
Figure 11:
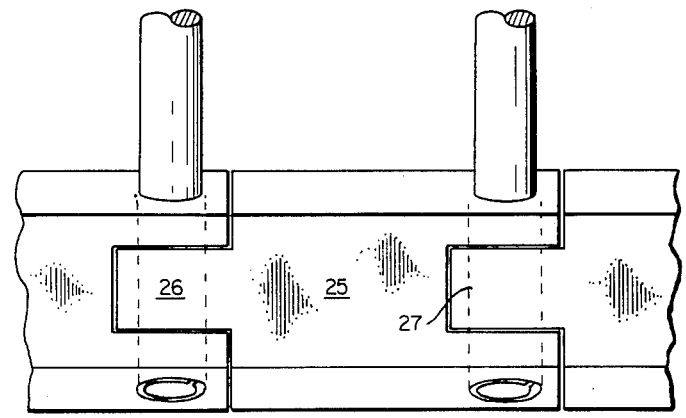
FIG. 11 is a partial bottom plan view of V-shaped links formed into a conveyor.
Figure 12:
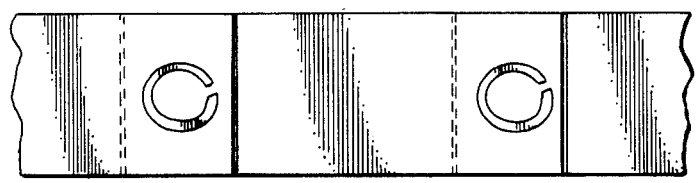
FIG. 12 is a partial side, elevational view of the V-shaped links of FIG. 11.

A V-drive conveyor of particular utility is disclosed in FIGS. 11 through 13. Dovetail links 25 are interconnected with rods 10 to form a rod-type conveyor wherein the rods are uniformily spaced and the drive "belts" are V-shaped so that pulleys may be used to drive the conveyor. The pulleys may be notched on the inside rim to maintain a perpendicular relationship between the rods and the links. The driving force, however, is provided by friction between the pully and V-shaped links rather than by notches on the pulley.

The links 25, as illustrated, have a tongue 26 on one end and a notch 27 on the other end. If desired, links may be used wherein some links have tongues on both ends and other links are notched on both ends. Such links would be alternated in use.

The conveyor and components illustrated in FIGS. 11 through 13 are particularly useful inasmuch as individual links may be replaced yet the drive system acts as a continuous belt and pulleys may be used to drive the conveyor instead of sprockets. A conveyor using links 25 and driven by pulleys will generally be very quiet in comparison to a sprocket drive system.

Tongue and groove links of the type generally shown in FIGS. 11 through 13 may also be made with a substantially square cross-section rather than a V-shape, if desired.

The anchoring of rods into the link members is the same for the tongue and groove links as the links described hereinabove. A substantially cylindrical bushing is used.

Reinforcement of the tongue and the projecting tabs on each side of the groove with fiberglass, metallic fibers and the like may be desirable to strengthen those parts since they are generally smaller in cross-section than the remainder of the links and will experience more flexing as the conveyor turns around a pulley or sprocket.

Figure 14:
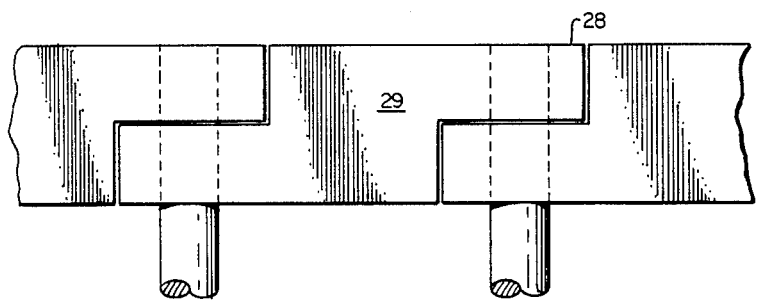
FIG. 14 is a partial, top plan view of V-shaped links which have only one tongue per end.
Figure 15:
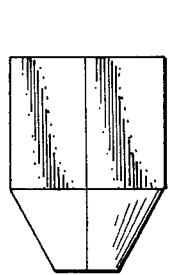
FIG. 15 is an end elevational view of a V-shaped link of FIG. 14.
Figure 16:
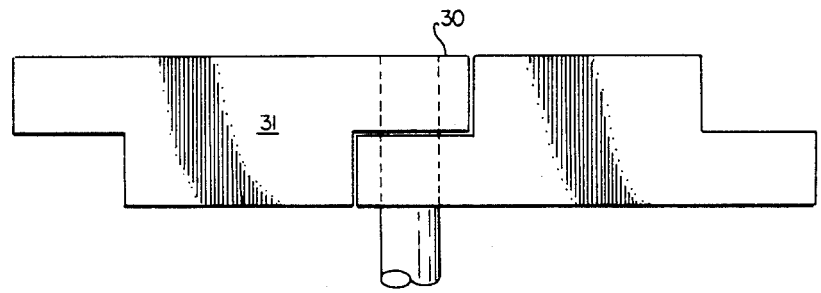
FIG. 16 is a partial, top plan view of another type of V-shaped link having a single tongue per end.

The conveyors illustrated in FIGS. 14, 15 and 16 are a variation of the one shown in FIGS. 11 through 13. The tongue portions 28 and 30 of the links 29 and 31 are overlapped to form a V-shaped drive. Links 29 and 31 can be identical in form.

The rods used in the conveyors of this invention are generally cylindrical in shape, i.e., have a round cross-sectional shape. However, rods having square or triangular cross-sections may be utilized if desired. Generally, the cross-sectional shape of the hollow rod-locking members will conform to the shape of the rod.

The rod locking means are positioned in said links so that no relative movement occurs between these two parts. The locking means may be adhered to the link by adhesive or the link may be molded about the locking means.

The novel conveyors of this invention are particularly advantageous inasmuch as they combine many of the desirable features of belt drives with the advantages of a spaced rod conveyor.

I claim:

1. A link for joining metal rods to form a conveyor chain of spaced metal rods, said link comprising:
    an elongated body of a tough, hard, very slightly flexible elastomer;
    at least a pair of spaced, parallel, substantially cylindrical cavities in said elongated body;
    at least a pair of hollow metallic rod locking means tightly adhered to at least a portion of the walls of said cavities to accept the ends of a pair of rods, said rod locking means having spring means with internal cross-sectional dimensions slightly smaller than said rods so that a forced fit is achieved between said rods and said locking means.

2. The link of claim 1 wherein said tubular cavities extend through the body of said link.

3. A metal rod conveyor sub-assembly comprising:
    at least a pair of spaced metal rods;
    at least a pair of spacing means spacing said metal rods and securing them in a substantially fixed relationship, said spacing means located near the ends of said rods;
    at least a pair of rod tips extending beyond each spacing means at the outer ends of the rods, said rod tips on each side of the sub-assembly being spaced apart at about the same spacing as the farthest spaced rods;
    flights comprising tough, very slightly flexible elastomer bodies attached to and extending along the length of said rods between spacing means.

4. The sub-assembly of claim 3 wherein said rod tips are the tips of the pair of rods which are furthest spaced from one another.

5. The sub-assembly of claim 3 wherein said spacing means are formed of a tough, very slightly flexible elastomer.

6. The link of claim 1 wherein said metal rods are solid rods having a substantially cylindrical shape and said hollow metallic rod locking means have a substantially cylindrical internal shape.

7. The link of claim 1 wherein said elongated body is a rubber elastomer.

8. The link of claim 1 wherein said elongated body of a tough, hard, slightly flexible, elastomer has a barbell shape.

9. The link of claim 1 wherein said elongated body is reinforced with fibers.

10. The link of claim 1 wherein the elongated body has sufficient material surrounding said rod locking means to provide adequate bearing strength.

11. The link of claim 1 wherein said rod locking means is a split metal sleeve.

12. The link of claim 8 wherein said spaced parallel substantially cylindrical cavities are in the bell portions of said barbell shaped elongated body.

* * * * *